(12) United States Patent
Schmidt

(10) Patent No.: US 7,034,877 B2
(45) Date of Patent: Apr. 25, 2006

(54) DIGITAL CAMERA LCD SCREEN PROTECTOR ACCESSORY

(75) Inventor: Robert P. Schmidt, West Hollywood, CA (US)

(73) Assignee: Hoodman Corporation, Torrance, CA (US)

( * ) Notice: Subject to any disclaimer, the term of this patent is extended or adjusted under 35 U.S.C. 154(b) by 636 days.

(21) Appl. No.: 10/047,963

(22) Filed: Jan. 15, 2002

(65) Prior Publication Data

US 2002/0126216 A1 Sep. 12, 2002

Related U.S. Application Data

(60) Provisional application No. 60/274,141, filed on Mar. 8, 2001.

(51) Int. Cl.
*H04N 5/222* (2006.01)

(52) U.S. Cl. .................... 348/333.01; 396/534

(58) Field of Classification Search ........... 348/333.01, 348/373, 375; 396/534
See application file for complete search history.

(56) References Cited

U.S. PATENT DOCUMENTS

| | | | | |
|---|---|---|---|---|
| 3,677,160 A | * | 7/1972 | Harvey | 396/350 |
| 4,211,823 A | * | 7/1980 | Suzuki et al. | 428/412 |
| 4,729,648 A | * | 3/1988 | Armstrong | 359/610 |
| 6,453,125 B1 | * | 9/2002 | Shono | 396/287 |

* cited by examiner

*Primary Examiner*—Tuan Ho
(74) *Attorney, Agent, or Firm*—Fildes & Outland, P.C.

(57) ABSTRACT

A protective device for a digital camera view finder of the LCD screen type includes a frame adapted to fit around edges of the viewfinder having connectors for connecting the frame to edges of the viewfinder, and a window viewing portion surrounded and supported by the frame providing unobstructed viewing of the LCD screen through the window. A glare reduction device is connectable to the protective device to provide glare free viewing of the LCD screen.

10 Claims, 4 Drawing Sheets

DIGITAL CAMERA LCD SCREEN PROTECTOR ACCESSORY

CROSS REFERENCE TO RELATED APPLICATION

This application claims the benefit of U.S. Provisional Application No. 60/274,141, filed Mar. 8, 2001.

FIELD OF THE INVENTION

This invention relates to protective devices for digital camera LCD screens and more particularly to a device that allows viewing of the LCD screen through the device while the device is protecting the LCD screen. The device also provides a mount for a glare reduction device allowing the LCD screen to be viewed easily in outdoor sunlight.

BACKGROUND OF THE INVENTION

It is known in the art relating to digital cameras to provide an opaque cover fittable over a LCD screen to protect the LCD screen when the camera is not in use. When the camera is being used the cover must be removed rendering the LCD screen susceptible to damage.

Often digital cameras are used outside and at sporting events. Professional photographers may use many cameras in their work. When covering an event the photographer may have three or more cameras, each with a different lens, strapped around her neck. Some photographers leave the protective coverings off their cameras exposing the LCD screens to damage caused by the camera bodies swinging around and hitting the LCD screens. Other photographers deal with the task of taking off and putting on the opaque protective coverings. Often these protective coverings are lost in the field during camera use.

Furthermore, when these digital cameras with LCD screens are used in bright light, the photographer often has to shield the camera LCD screen so that the screen can be viewed.

SUMMARY OF THE INVENTION

The present invention provides a protector accessory which mounts over a LCD screen of a digital camera such as for example among others the Nikon D1. The protector includes a viewing portion of an optically clear plastic that allows the LCD screen to be viewed through the viewing portion. The viewing portion may be scratch resistant and preferably is clear Lexan® plastic. The protector also includes a mounting portion having mounts for mounting the protector about the LCD screen. The mounting portion surrounds the viewing portion and preferably the two portions are made as one plastic injection molded part.

When mounted about the LCD screen, the protector protects the LCD screen while allowing simultaneous viewing thereof.

In one embodiment of the protector, the mounting portion includes at least one connector for connecting a glare reducing device to the protector. The connector may be a tab, flange, or other means for connecting the glare reducing device to the protector. The glare reducing device includes a cooperating connector. The glare reducing device is of a tubular shape and eliminates glare associated with outside viewing of the camera LCD screen. The glare reducing device may be of flexible or rigid construction and may have straight walls or be of a collapsible bellows construction.

These and other features and advantages of the invention will be more fully understood from the following detailed description of the invention taken together with the accompanying drawings.

DETAILED DESCRIPTION OF THE INVENTION

Figure 1:
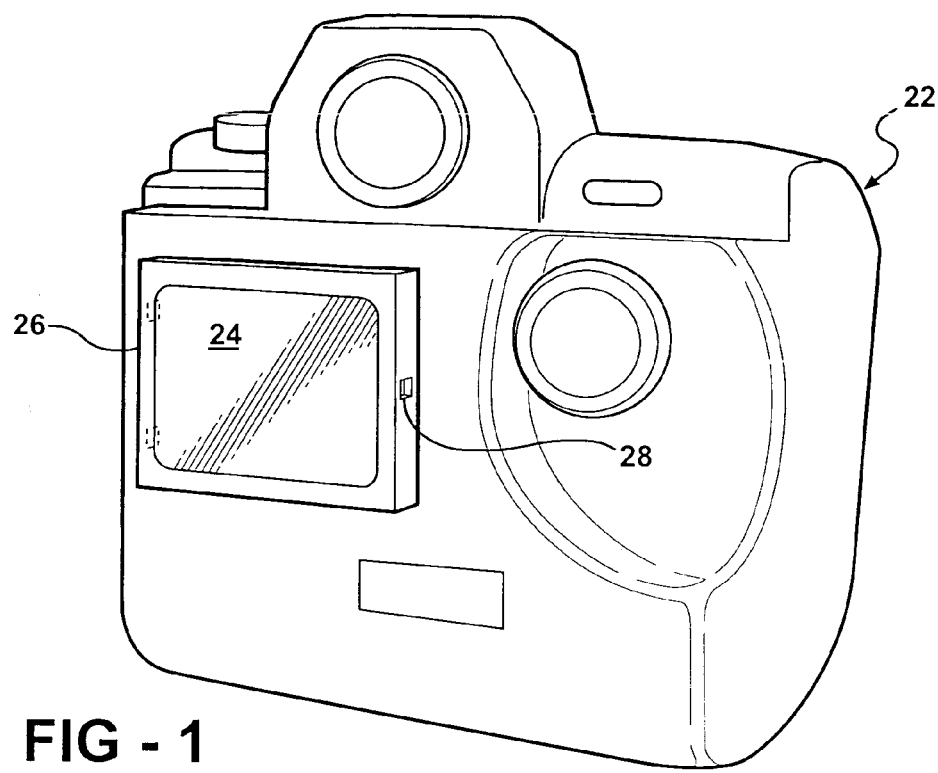
FIG. 1 is a perspective view of a digital camera having a LCD viewing screen.

Referring now to the drawings in detail, a protective device according to the invention is generally indicated by reference numeral 20 and is adapted for use with a digital camera 22 having a LCD viewfinder 24. As is hereinafter more fully described, the protective device 20 provides protection to the LCD viewfinder 24 while allowing the LCD display to be viewed therethrough. Furthermore, the protective device 20 provides for the mounting of various glare reducing and/or eliminating devices on the device as is more fully hereinafter described.

Figure 3:
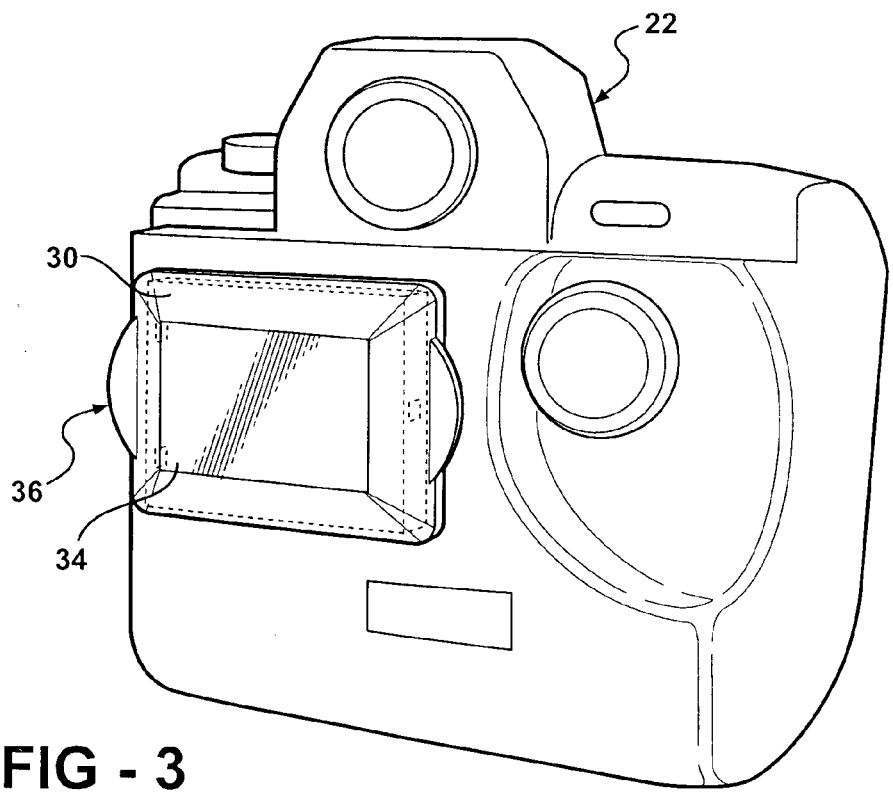
FIG. 3 is a perspective view of the digital camera of FIG. 1 having the LCD screen protector of FIGS. 2A–2E mounted about the LCD viewing screen.
Figure 2A:
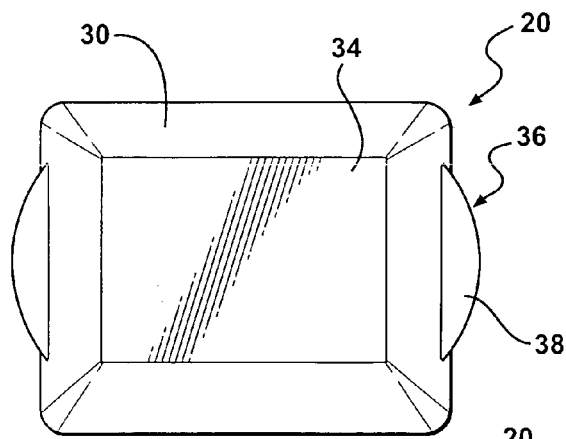
FIGS. 2A–2E are various views of a digital camera LCD screen protector constructed in accordance with the present invention.
Figure 2B:
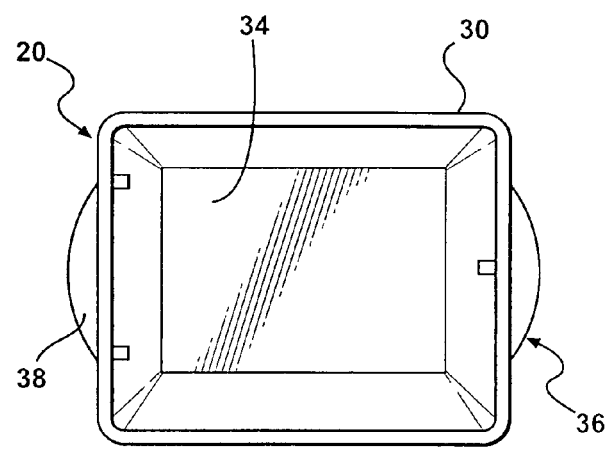
Figure 2C:
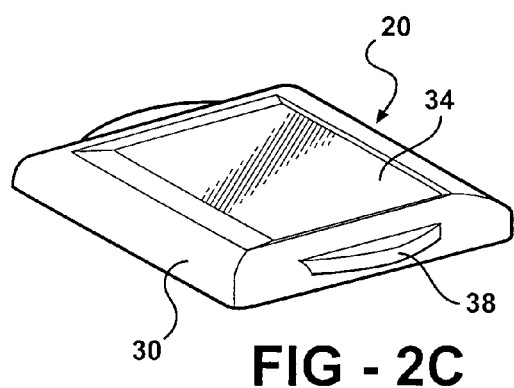
Figure 2E:
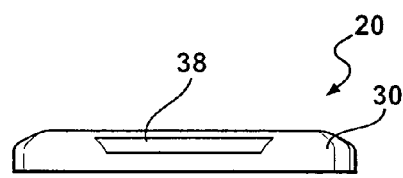
Figure 2D:
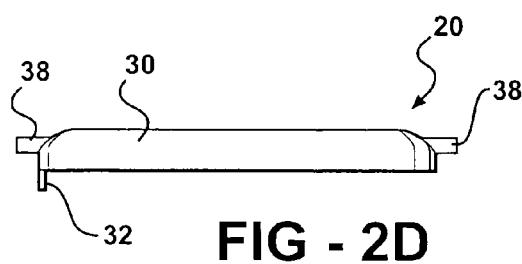

In FIG. 1 there is illustrated a digital camera 22 that includes a LCD viewfinder 24. A frame 26 of the viewfinder 24 includes a plurality of attachment features 28. The protective device 20 is attachable to the attachment features 28 to mount the protective device to the viewfinder 24 as shown in FIG. 3.

FIGS. 2A through 2E illustrate an embodiment of the protective device 20. Protective device 20 includes a frame 30 adapted to fit around the frame 26 of the viewfinder 24. Frame 30 includes connectors 32 for connecting the frame to the viewfinder. Connectors 32 correspond with attachment features 28 and together the connectors and attachment features provide a snap-fit attachment that connects the frame 30 to edges of the viewfinder 24.

Protective device 20 includes a window viewing portion 34 surrounded and supported by frame 30. Window viewing portion 34 is transparent and may be integral with frame 30 or alternatively set into the frame. Window viewing portion 34 is preferably made of a scratch resistant plastic and clear Lexan® plastic has found wide acceptance and serviceablity as a plastic of choice.

The protective device 20 also includes mounts 36 disposed on frame 30 for mounting a glare reduction device on the protective device and thereby on the camera 22. Mounts 36 are illustrated as a pair tabs 38 extending outwardly from frame 30 to which a glare reduction device is adapted to be attached as hereinafter more fully described.

Figure 4:
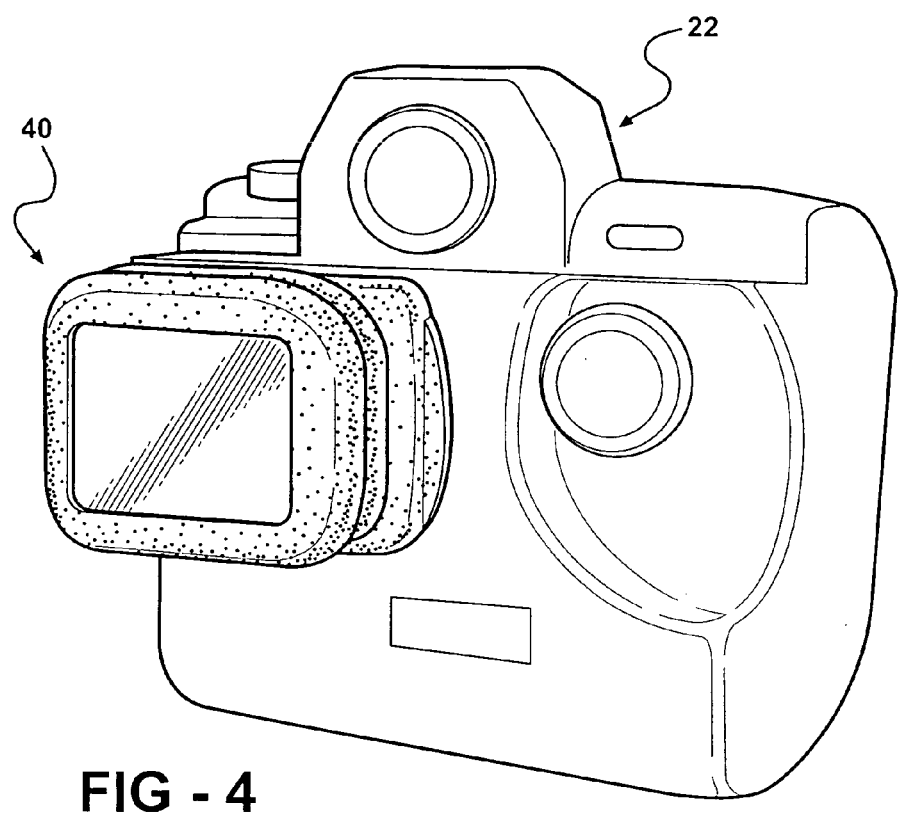
FIG. 4 is a perspective view of the digital camera of FIG. 1 having a glare reducing device connected to the LCD screen protector of FIGS. 2A–2E mounted about the LCD viewing screen.

Referring to FIGS. 5A through 5E there is shown a glare reduction device 40 that is adapted to fir onto the protective device 20 via a cooperable connector 42 connecting with tabs 38. Glare reduction device 40 is a bellows type glare reduction device having side walls 44 which are expandable to form a tubular shape and collapsible to flatten against the frame 30. Glare reduction device 40 may be made of any flexible material and is preferably formed from a rubberized plastic or fabric material. As shown in FIG. 4, the glare reduction device 40 may be fitted on a protective device 20 and the combination of the glare reduction device and protective device may by mounted to a digital camera 22.

Figure 6:
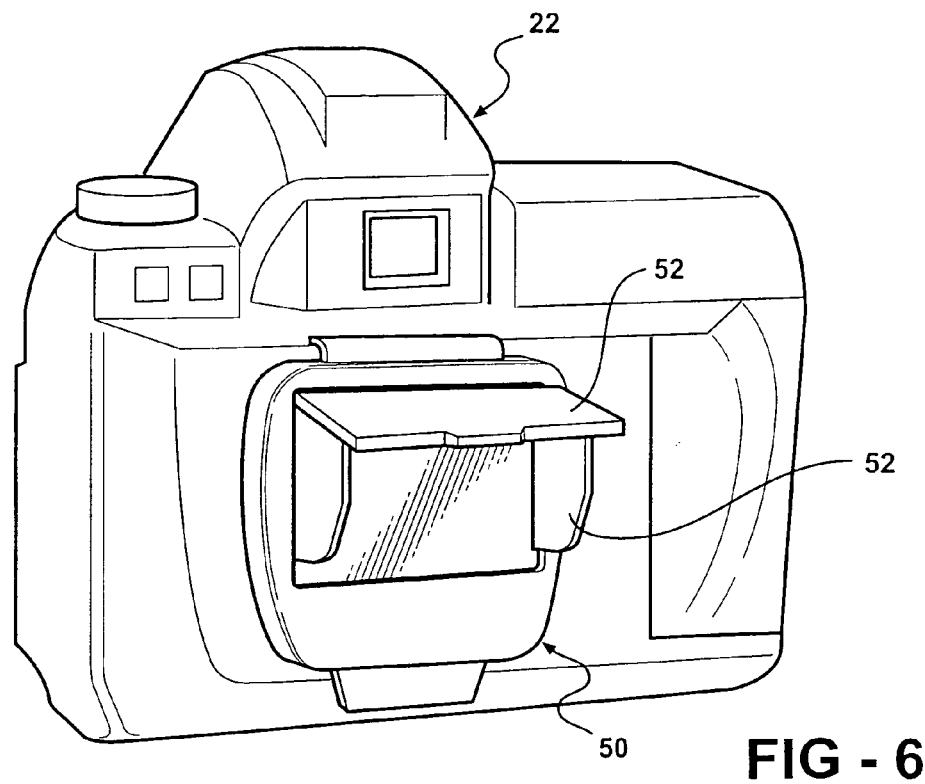
FIG. 6 is a perspective view of the digital camera of FIG. 1 illustrating a glare reduction having rigid walls mounted on the protector.
Figure 5A:
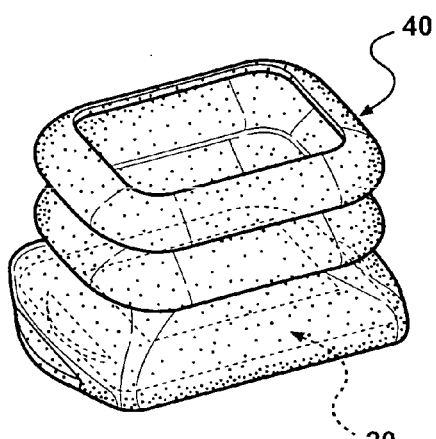
FIGS. 5A–5E are various views of a glare reducing device constructed in accordance with the present invention illustrating its connection to the LCD screen cap.
Figure 5B:
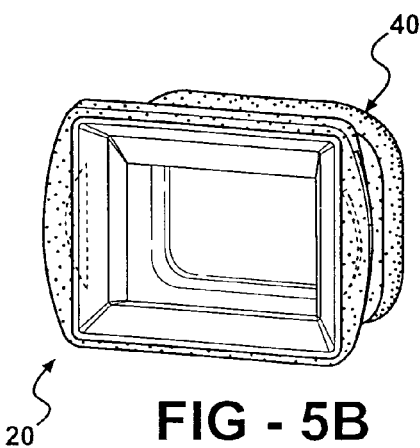
Figure 5C:
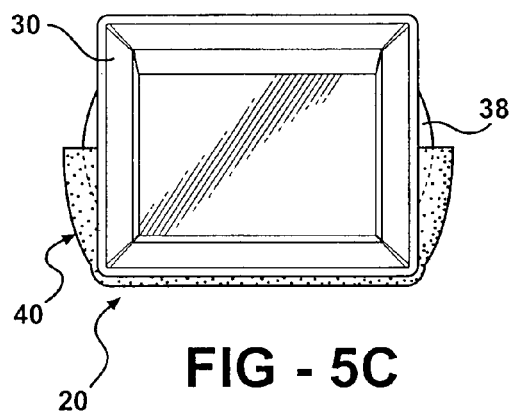
Figure 5D:
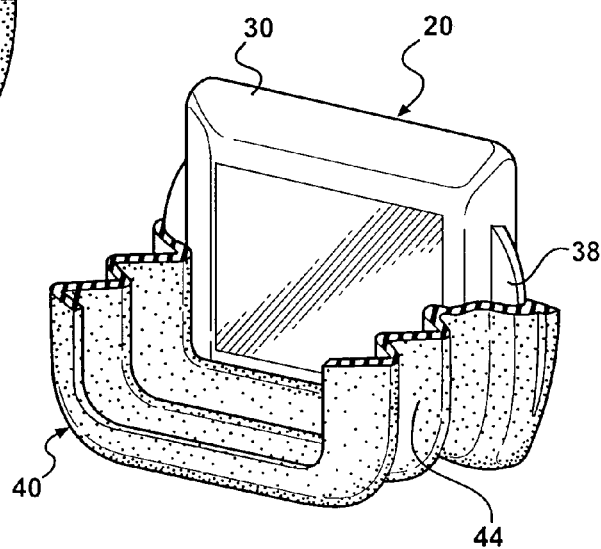
Figure 5E:
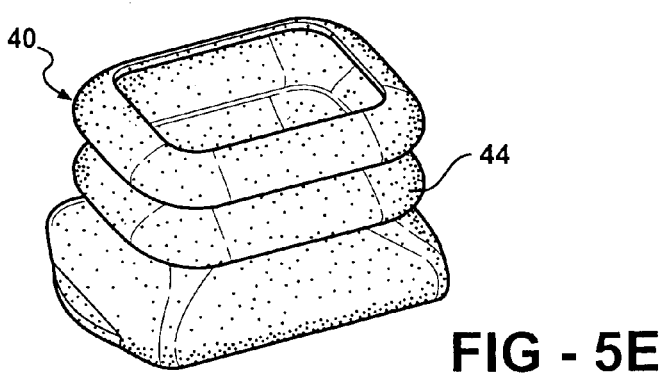

Alternatively a glare reduction device 50 of a rigid construction having at least three rigid side members 52 may be adapted for use in combination with the protective device 20 and is shown in FIG. 6.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A protective device for a digital camera view finder including a LCD screen, the device comprising:
    a frame adapted to fit around edges of the viewfinder;
    said frame including connectors for removably connecting said frame to edges of the viewfinder and at least one mount adapted to mount a glare reduction device to said frame; and
    a window viewing portion surrounded and supported by said frame providing unobstructed viewing of said LCD screen through said window viewing portion.

2. The protective device of claim 1 wherein said mount is a tab adapted to connect to a feature in the glare reduction device.

3. The protective device of claim 2 including in combination a glare reduction device adapted to mount to said frame.

4. The protective device of claim 3 wherein said glare reduction device is of a bellows construction allowing it to be expanded from said frame along a viewing axis for use and collapsible against said frame in a non-use position.

5. The protective device of claim 4 wherein said glare reduction device comprises a fabric.

6. The protective device of claim 3 wherein said glare reduction device includes at least three rigid side members.

7. The protective device of claim 6 wherein said glare reduction device comprises plastic material.

8. The protective device of claim 1 wherein said device comprises plastic material.

9. The protective device of claim 8 wherein said window viewing portion is scratch resistant.

10. The protective device of claim 8 wherein said window viewing portion is Lexan® plastic.

* * * * *